United States Patent [19]

Nakazawa et al.

[11] Patent Number: 5,852,288

[45] Date of Patent: Dec. 22, 1998

[54] BAR CODE SCANNING APPARATUS

[75] Inventors: Atsushi Nakazawa; Mitsuru Nishikawa, both of Osaka, Japan

[73] Assignee: Sumitomo Electric Industries, Ltd., Osaka, Japan

[21] Appl. No.: 676,244

[22] PCT Filed: Sep. 13, 1995

[86] PCT No.: PCT/JP95/01827

§ 371 Date: Jul. 17, 1996

§ 102(e) Date: Jul. 17, 1996

[87] PCT Pub. No.: WO96/09596

PCT Pub. Date: Mar. 23, 1996

[30] Foreign Application Priority Data

Sep. 19, 1994 [JP] Japan .................................. 6-223611

[51] Int. Cl.⁶ ...................................................... G06K 7/10
[52] U.S. Cl. ............................................. 235/472; 235/462
[58] Field of Search ..................................... 235/462, 472, 235/463, 467, 454, 469, 470; 250/227.13; 322/312, 314, 317

[56] References Cited

U.S. PATENT DOCUMENTS

| | | | |
|---|---|---|---|
| 4,210,802 | 7/1980 | Sakai ........................................ | 235/483 |
| 4,818,856 | 4/1989 | Matsushima et al. .................... | 235/472 |
| 4,820,911 | 4/1989 | Arackellian et al. ..................... | 235/467 |
| 5,285,056 | 2/1994 | Tedesco et al. .......................... | 235/472 |
| 5,369,262 | 11/1994 | Dvorkis et al. .......................... | 235/472 |
| 5,430,285 | 7/1995 | Karpen et al. ........................... | 235/462 |

FOREIGN PATENT DOCUMENTS

| | | |
|---|---|---|
| 63-67692 | 3/1988 | Japan . |
| 64-12384 | 1/1989 | Japan . |
| 1-196680 | 8/1989 | Japan . |
| 2-291086 | 11/1990 | Japan . |

*Primary Examiner*—Donald T. Hajec
*Assistant Examiner*—Thien Minh Le
*Attorney, Agent, or Firm*—Rabin & Champagne, P.C.

[57] ABSTRACT

A bar code scanning apparatus in which the visual field of a lens system is extended as outwardly exceeding the width of an opening of a case body in which the apparatus is housed, such that a bar code wider than the width of the opening can be scanned. A bar code wider than the width of the opening can be scanned with the opening coming in contact with the bar code. Thus, a wide bar code can be scanned without the bar code scanning apparatus increased in width and length.

14 Claims, 11 Drawing Sheets

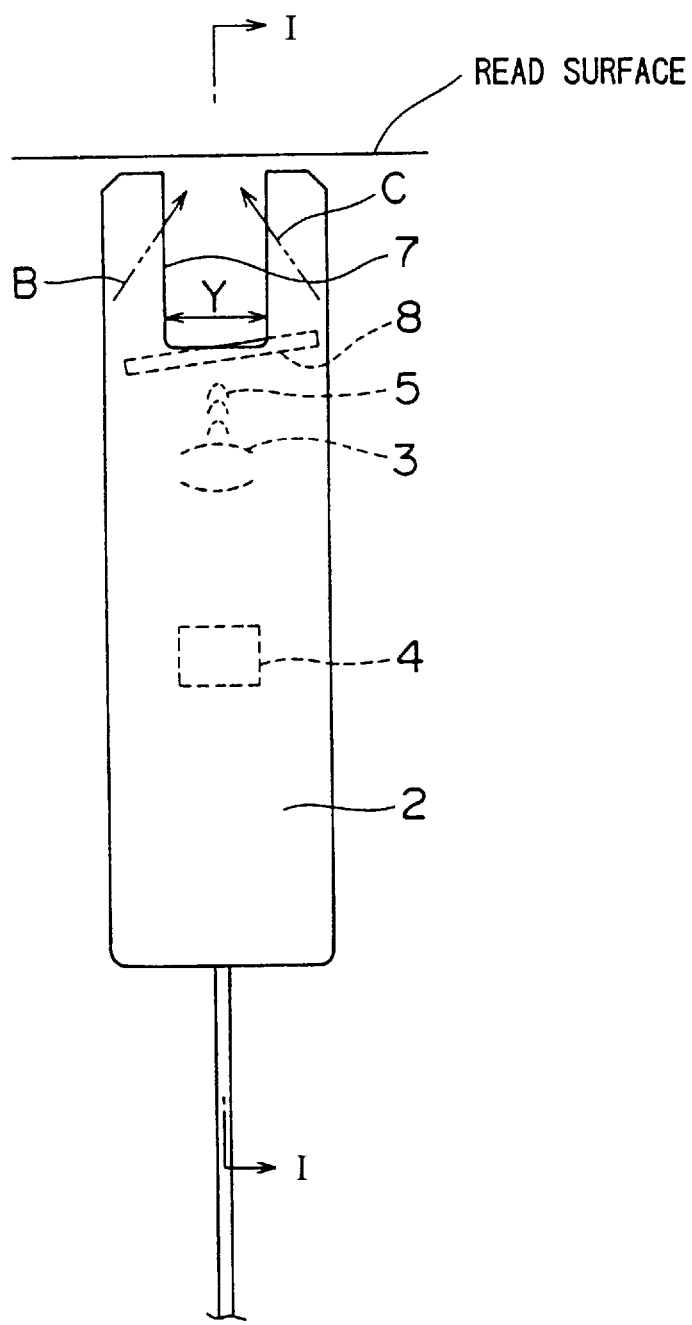

F I G. 5A
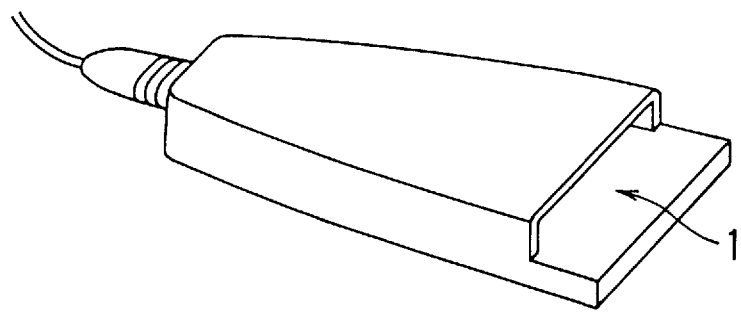
F I G. 5B
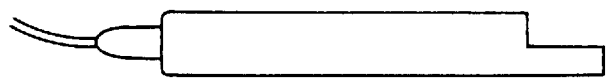
F I G. 6A
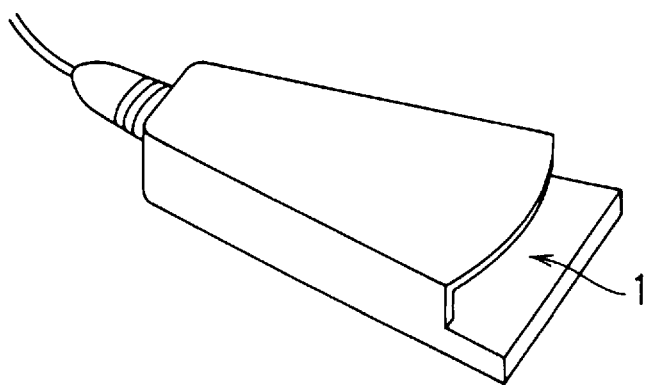
F I G. 6B
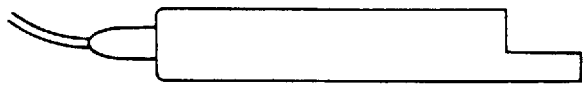

F I G. 7
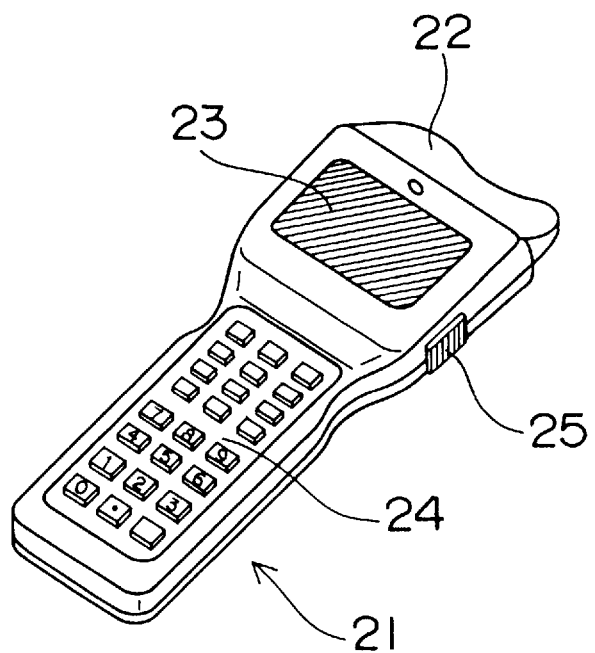

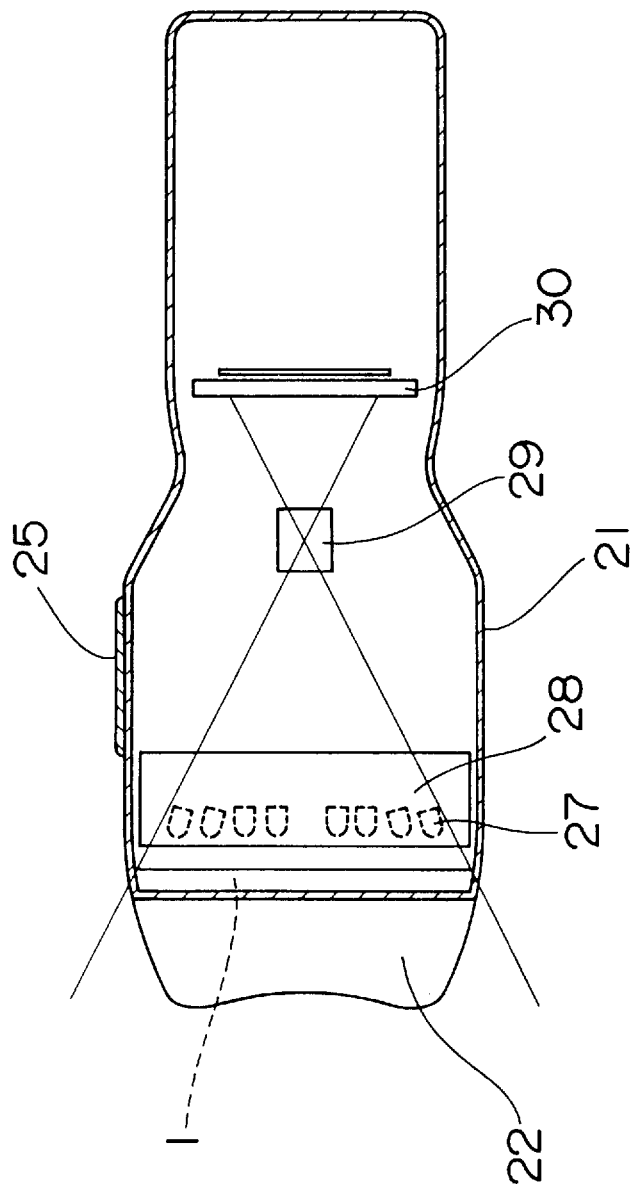

F I G. 13
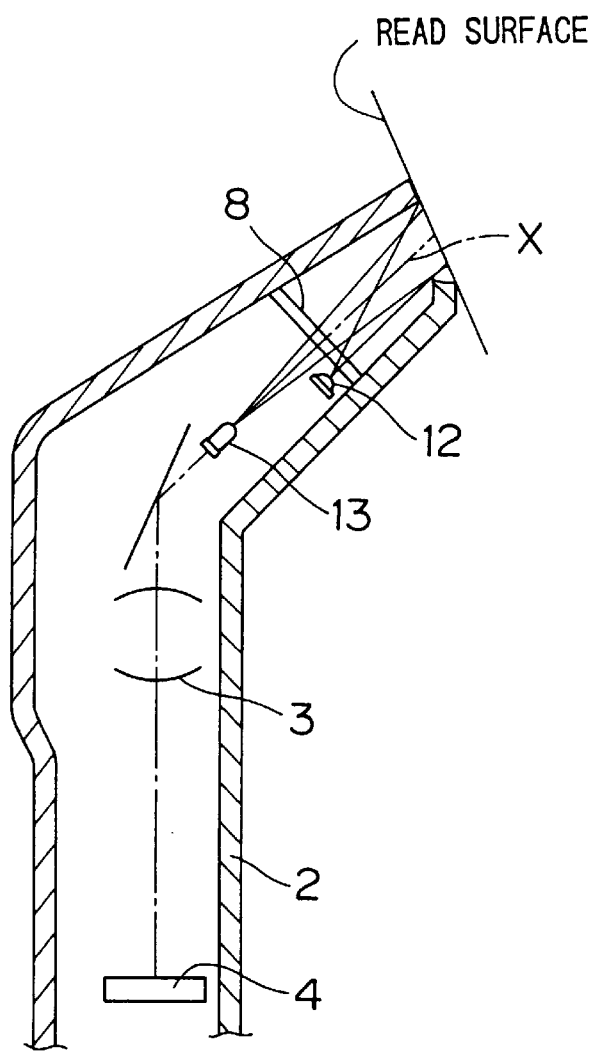
F I G. 14
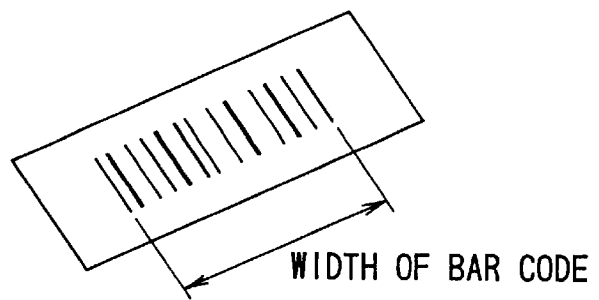

BAR CODE SCANNING APPARATUS

BACKGROUND OF THE INVENTION

1. Field of the Invention

The present invention relates to a bar code scanning apparatus in which the image of a bar code to be read is formed on an image sensor through a lens system.

2. Description of the Related Art

A bar code scanning apparatus is arranged such that light from an illuminating light source is irradiated onto a sheet having a bar code formed thereon and that the bar code is read by an image sensor.

Generally, a bar code scanning apparatus is of the portable type or of the scanner integral type incorporated in a handy terminal (portable-type information collection device), and is used in direct contact with a sheet or separated by a predetermined distance therefrom (See Japanese Unexamined Patent Publications Nos. 64-12384 (1989) and 1-196680 (1989)).

The bar code width in the scanning direction (See FIG. 14) is determined based on a bar code system to be used (JAN Code, NW-7, Code 39, ITF Code etc.) and the number of code digits, but the average code width is about 40 to 50 mm. For product management at a factory or warehouse, however, there is used a bar code having 20 to 30 digits. Further, as a bar code printed on corrugated cardboard, there is used a bar code having bar elements each having a width not less than 1 mm. This results in a bar code having a width of 80 mm or more.

To read such a wide bar code, there is needed a bar code scanning apparatus opening. As a matter of fact, there is produced a bar code scanning apparatus having a wide opening capable of reading a bar code having a width of 100 mm.

Further, to read a wide bar code, there is also produced a bar code scanning apparatus arranged to read a bar code separated therefrom through a space.

To read a bar code in contact with the apparatus as mentioned earlier, the bar code scanning apparatus becomes wide in its opening and is therefore increased increased in length. This disadvantageously increases the size of the apparatus in its entirety. This becomes a serious problem particularly when the bar code scanning apparatus is incorporated in a handy terminal.

In a bar code scanning apparatus arranged to read a bar code separated therefrom, it is required to accurately take aim with the apparatus at a bar code when the apparatus is held in the hand. This disadvantageously lowers the maneuverability of the apparatus in maneuverability.

SUMMARY OF THE INVENTION

It is an object of the present invention to provide a compact and readily operable bar code scanning apparatus capable of reading a wide bar code.

To achieve the above object, the present invention provides a bar code scanning apparatus arranged such that the visual field of the lens system is extended outwardly to exceed the width of an opening of a case body in which the bar code scanning apparatus is housed, such that a bar code wider than the width of the opening can be scanned.

According to the arrangement above-mentioned, the visual field of the lens system is extended as outwardly exceeding the width of the opening of the case body in which the bar code scanning apparatus is housed. Therefore, a bar code wider than the width of the opening can be scanned with the opening coming in contact with the bar code. Thus, even a wide bar code can be scanned without the bar code scanning apparatus being increased in width and length.

More specifically, a slit which communicates with the opening is provided in each of the lateral sides of the case body, the opening is spread in the form of a fan or the case body is formed with a portion projecting from the opening such that a predetermined distance is provided between the opening and a read surface when the apparatus is applied to the read surface.

Preferably, the projecting portion projects from one side of the case body in which the bar code scanning apparatus is housed, and the light sources are disposed at the side opposite to the one side. According to this arrangement, the projecting portion intercepts external irregular light.

Preferably, the tip of the projecting portion is made in the form of a plane to regulate the bar code reading angle. According to this arrangement, a bar code can be read in a stable manner.

Preferably, light sources for illuminating a read surface, are disposed on the plane including both the bar code scanning axis and the optical axis of the lens system.

When the light sources are disposed on the plane including both the bar code scanning axis and the optical axis of the lens system, the light sources can uniformly illuminate not only the central zone of the opening but also zones outside of both lateral ends of the opening.

Particularly, in the apparatus having lateral sides with a slit which communicates with the opening, when the light sources for illuminating a read surface are disposed on the plane including both the bar code scanning axis and the optical axis of the lens system, the illuminating light is not intercepted by wall portions which define the slits. This prevents both ends of a bar code wider than the width of the opening from being darkened. Further, since the slits can be made narrow, the mechanical strength of the case body can properly be maintained.

More preferably, the light sources are disposed at both lateral sides of the optical axis of the lens system such that the light sources disposed at the left of the optical axis illuminate the right side of a bar code, and the light sources disposed at the right of the optical axis illuminate the left side of the bar code.

When the light sources are disposed at both lateral sides of the optical axis of the lens system such that the light sources disposed at the left of the optical axis illuminate the right side of a bar code, and the light sources disposed at the right of the optical axis illuminate the left side of the bar code, the influence of regular reflection of the illuminating light can readily be eliminated.

The light sources for illuminating a read surface may comprise first light sources for illuminating the open zone of the opening, and second light sources for illuminating zones outside of the lateral ends of the opening, the second light sources being disposed in the plane including both the bar code scanning axis and the optical axis of the lens system.

When the light sources for illuminating a read surface are formed by first light sources for illuminating the open zone of the opening, and second light sources which are to illuminate zones outside of the lateral ends of the opening and which are disposed in the plane including the bar code scanning axis and the optical axis of the lens system, light sources having the arrangement of prior art can be used as the first light sources. This is advantageous in view of design and cost. Further, since it is sufficient to merely add the second light sources, the apparatus can be made in a compact design.

These and other features, objects and advantages of the present invention will be more fully apparent from the following detailed description set forth below when taken in conjunction with the accompanying drawings.

BRIEF DESCRIPTION OF THE DRAWINGS

FIG. 2 is a side view of the bar code scanning apparatus in FIG. 1;

FIG. 5A and FIG. 5B are perspective and side views of a bar code scanning apparatus in which a portion, arranged to be applied to a read surface, extends from the tip of the opening;

FIG. 6A and FIG. 6B are perspective and side views of a bar code scanning apparatus in which the opening is spread in the form of a fan and in which a portion, arranged to be applied to a read surface, extends from the tip of the opening;

FIG. 7 is a perspective view of a handy terminal in which a nose-like portion, arranged to be applied to a read surface, extends from the tip of the opening;

FIG. 9 is a sectional view, taken along the line IX—IX of the handy terminal of FIG. 8;

FIG. 13 is a sectional view in side elevation of the bar code scanning apparatus in FIG. 12; and FIG. 14 is a perspective view of a bar code.

DESCRIPTION OF THE PREFERRED EMBODIMENTS

The following description will discuss in detail the present invention with reference to the attached drawings illustrating embodiments thereof.

Figure 1:
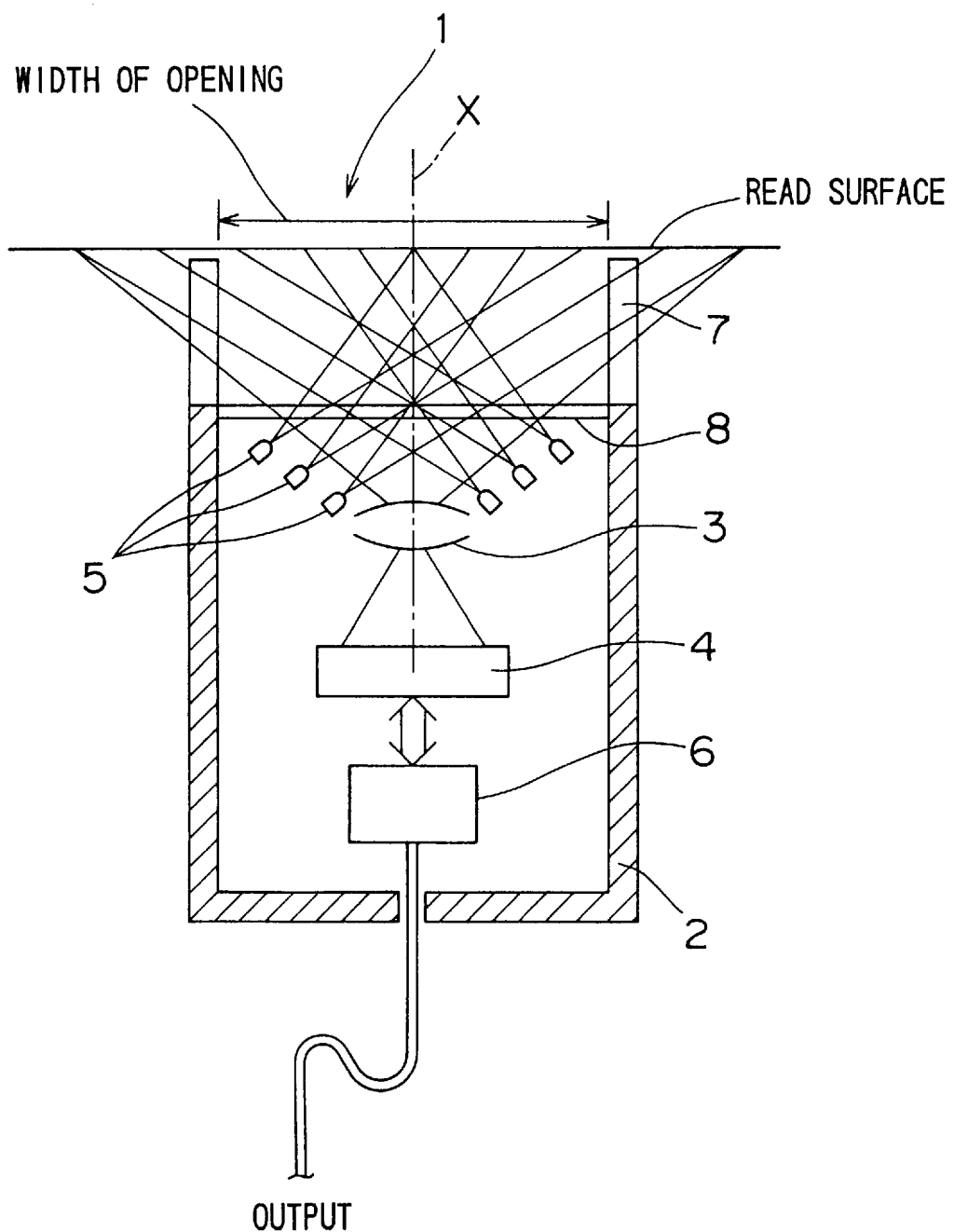
FIG. 1 is a section view, taken along the line II in FIG. 2, of a bar code scanning apparatus.

FIG. 2 is a side view of a bar code scanning apparatus of the present invention, and FIG. 1 is a sectional view taken along the line I—I in FIG. 2.

The bar code scanning apparatus is housed in a rectangular parallelepiped case body 2 which can be held in hand. This apparatus comprises a lens system 3 for condensing scattering light reflected from a bar code, a one-dimensional image sensor 4 on which the bar code image is to be formed, a plurality of illuminating light sources 5 formed by LEDs and a signal process circuit 6 for reading the contents of the bar code.

The lens system 3 comprises two to three combined spherical lenses, a single non-spherical lens or a combination of spherical and non-spherical lenses. In his embodiment, the lenses serve as a wavelength filter bandpass filter) since the entire lens surfaces are coated according to the wavelength of light. A stop of about 1 mm in diameter (not shown) is inserted in the lens system 3.

As the image sensor 4, there is often used a CCD linear sensor or MOS linear sensor in which the number of picture elements is about 1,000 to about 10,000. The number of picture elements is determined according to the scanning width and resolution required for a surface to be read. For example, when the scanning width is 65 mm, the resolution is 0.15 mm and five picture elements are required for one bar, about 2000 picture elements are required (65÷0.15× 5≅2,000).

The case body 2 is provided, in each of the lateral sides of the opening 1, with a slit 7 which communicates with the opening 1. This causes the visual field of the image sensor 4 to be extended outwardly so as to exceed the width of the opening 1 of the case body 2 (in the widthwise direction of a bar code).

It is therefore possible to scan a bar code that is wider than the width of the opening 1, with the opening 1 coming in contact with the bar code.

To prevent dust from sticking to the lens system 3 and the illuminating light sources 5, the opening 1 has a transparent window 8 made of a usual transparent material such as acrylic, polycarbonate and the like. If irregular reflected light or the like enters through the transparent window 8, a noise signal is generated, thus causing defective reading. Accordingly, the transparent window 8 is coated for prevention of reflection. Further, the transparent window 8 is slightly inclined to prevent light from the illuminating light sources 5 from regularly reflecting and entering the image sensor 4 (See FIG. 2).

The illuminating light sources 5 comprise LEDS (light emitting diodes) each of which is provided with a microlens, and which are symmetrically disposed at both lateral sides of the lens system 3. As shown in FIG. 1, the LEDs are arranged in a V shape with the lens system 3 at the apex. This V-shape arrangement is advantageous in that the entire set of illuminating light sources 5 can be made in a compact design. The LEDs at the left of the optical axis X are to illuminate the right side of a bar code, while the LEDs at the right of the optical axis X are to illuminate the left side of the bar code. The bar code is illuminated with the rays of light crossing each other in order to prevent regularly reflected light from entering the lens system 3. As abovementioned, the LEDs are disposed in a V shape. Accordingly, when the LEDs are the same in characteristics of luminous energy and directivity, the illumination intensity on a read surface becomes uneven. Thus, the electric currents flowing in the LEDs or the characteristics of directivity thereof are adjusted such that the illumination intensity becomes uniform. When the $\cos^4$ characteristics of the lens system 3 are taken into consideration, it is preferable to make the illumination brighter at both lateral ends thereof such that a uniform luminous energy is obtained on the image sensor 4.

This embodiment is characterized in that the LEDs are disposed in the plane including both the bar code scanning axis and the optical axis X, as shown in FIG. 2. If the LEDs are disposed such that a bar code is obliquely illuminated from under or above to the plane including both the bar code scanning axis and the optical axis X (See arrows B and C each shown by a long and two short dashes line in FIG. 2), some rays of light are intercepted by wall portions defining the slits 7. This causes the illumination of the bar code at both ends thereof to be darkened. In this embodiment, since the LEDs are disposed in the plane including the bar code scanning axis and the optical axis X, the bar code can uniformly be illuminated without rays of light intercepted by wall portions defining the slits 7. Further, the width Y of each slit 7 (See FIG. 2) can be minimized. This prevents the case body 2 from being lowered in mechanical strength.

Each LED is generally a red LED having a wavelength of 660 nm. However, the light emitting wavelength may suitably be changed to that of blue, green or ultra-red rays. Further, incandescent electric lamps or laser diodes may be used instead of LEDs.

There are instances where, under the influence of reflected scattering of external irregular light such as indoor light or the like, the illumination on a bar code at both ends thereof becomes brighter to form a remarkable contrast with the illumination on the center of the bar code, resulting in some difficulty in reading a bar code. In such a case, it is preferable to increase the light emitting intensity of the light sources 5 more than usual. However, increasing the light emitting intensity of the illuminating light sources 5 increases the likelihood that the image sensor 4 is saturated. Accordingly, it is preferable to use the electronic shutter function of the sensor to shorten the exposure time of the image sensor 4. When the image sensor 4 is not provided with the electronic shutter function, the following provision may be made. That is, the illuminating light sources 5 are made bright and a filter for lowering the level of light incident upon the image sensor 4 is disposed upstream of the image sensor 4. According to such an arrangement, the level of light incident upon the image sensor 4 becomes proper such that a bar code image excellent in S/N so as to present a suitable contrast, can be obtained.

According to the arrangement above-mentioned, even though the opening 1 of the bar code scanning apparatus is relatively narrow, a bar code wider than the width of the opening 1 can readily be read. Further, a bar code is read with the apparatus coming in contact therewith. It is therefore not required to accurately take aim with the apparatus at a bar code, as done in the arrangement in which a bar code is read with the apparatus separated therefrom. This improves the maneuverability.

FIG. 3 to FIG. 10 show modifications of shape of the opening 1 of the bar code scanning apparatus.

Figure 3A:
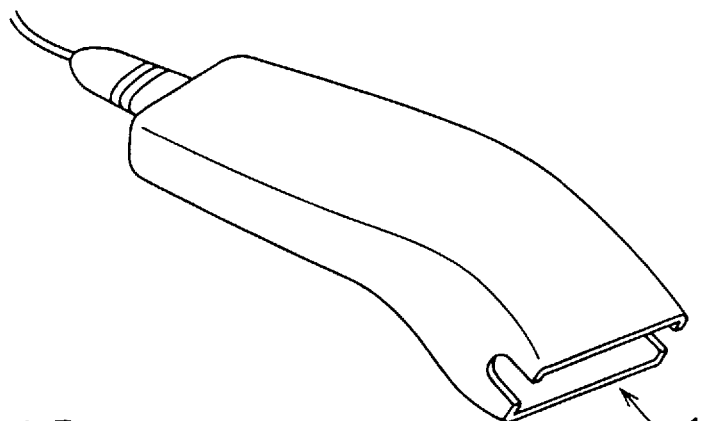
FIG. 3A and FIG. 3B are perspective and side views of a bar code scanning apparatus having an opening which is downwardly bent.
Figure 3B:
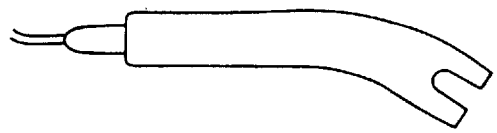

FIG. 3A shows an example in which the opening 1 is downwardly bent. This shape is advantageous in that the opening 1 is readily applied to a read surface. FIG. 3B is a side view of FIG. 3A.

Figure 4A:
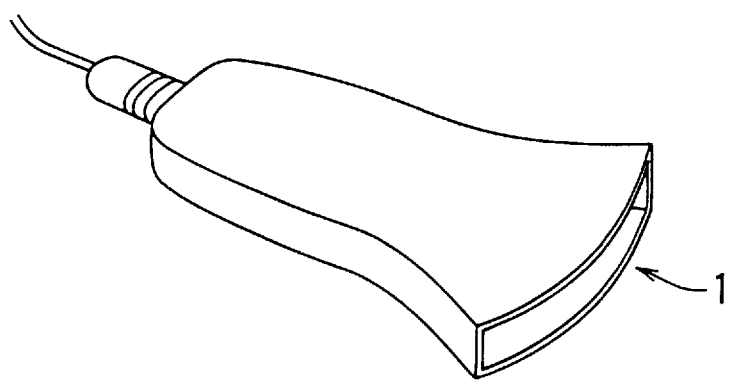
FIG. 4A and FIG. 4B are perspective and side views of a bar code scanning apparatus having an opening which is spread in the form of a fan.
Figure 4B:
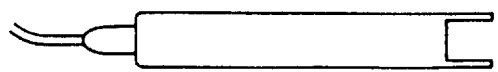

FIG. 4A shows an example in which the opening 1 is spread in the form of a fan. FIG. 4B is a side view of FIG. 4A.

FIG. 5A shows an example in which a portion arranged to be applied to a read surface, integrally extends from the tip of the opening 1. This shape provides a constant distance between the opening 1 and a read surface. This causes the visual field of the image sensor 4 to be extended outwardly exceeding the width of the opening 1. FIG. 5B is a side view of FIG. 5A.

FIG. 6A shows an example in which the opening 1 is spread in the form of a fan and a portion arranged to be applied to a read surface, integrally extends from the tip of the opening 1. This is a combination of the shape in FIGS. 4A and 4B with the shape in FIGS. 5A and 5B. FIG. 6B is a side view of FIG. 6A.

FIG. 7 shows a handy terminal 21 in which a nose-like portion 22 arranged to be applied to a read surface, integrally extends from the tip of an opening 1. This handy terminal 21 comprises, in a unitary structure, a bar code scanning apparatus, a display 23 and a keyboard 24. The handy terminal 21 is provided at the right lateral side thereof with a switch 25 to be operated for reading a bar code.

Figure 8:
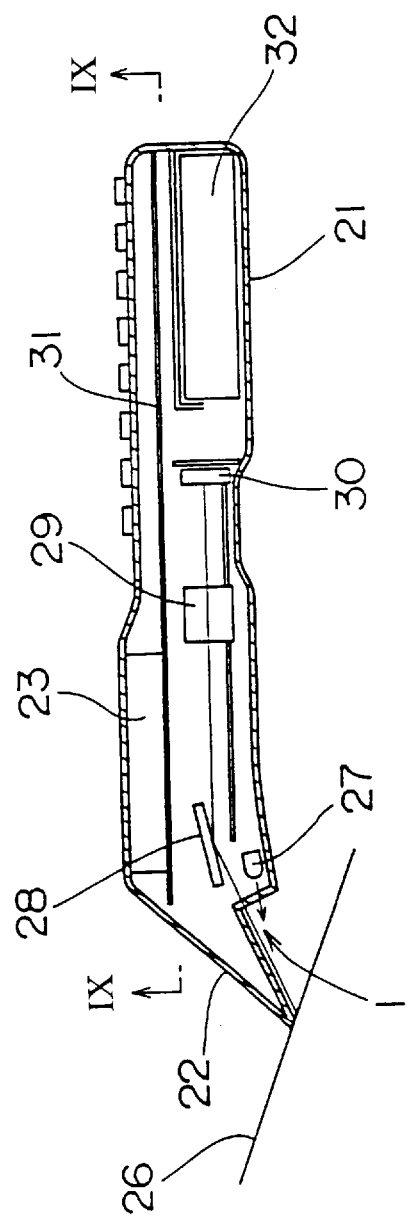
FIG. 8 is a sectional view in side elevation of the handy terminal of FIG. 7.

FIG. 8 is a sectional view in side elevation of the handy terminal 21, and FIG. 9 is a sectional view, taken along the line IX—IX in FIG. 8, of the handy terminal 21. When the switch 25 is operated with the nose-like portion 22 coming in contact with a bar code surface 26, LEDs 27 disposed at the lower portion of an opening 1 of the handy terminal 21, illuminate the bar code surface 26. The image of light reflected from the bar code surface 26 is formed on the image forming surface of a CCD image sensor 30 through the opening 1, a reflection mirror 28 and a lens 29. Also shown in FIG. 8 are a battery 32 for driving the handy terminal 21 and a circuit board 31.

According to the arrangement above-mentioned, even though the opening 1 of the bar code scanning apparatus is narrow, a bar code wider than the width of the opening 1 can be read. Further, since a bar code is read with the nose-like portion 22 coming in contact with the bar code surface 26, the image can automatically be in focus. Further, with the nose-like portion 22 up, the handy terminal 21 is applied to the bar code surface 26. Accordingly, the nose-like portion 22 also serves as a penthouse to shut out noise of external irregular light coming from above. Further, the LEDs 27 are disposed at the lower portion of the opening 1 and illuminate a space slightly on this side of the tip of the nose-like portion 22. It is therefore sufficient for a user to bring the handy terminal 21 such that the nose-like portion 22 covers a bar code. This considerably facilitates the operation.

Figure 10A:
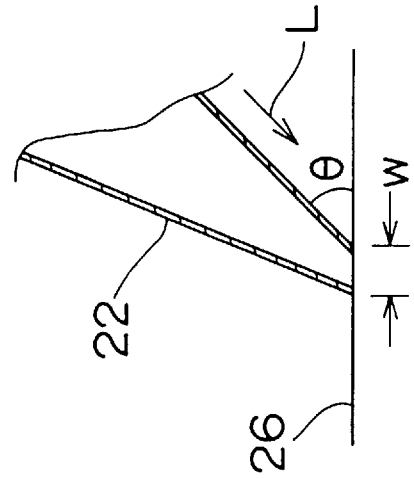
FIG. 10A and FIG. 10B are sectional views in side elevation of the tips of nose-like portions.
Figure 10B:
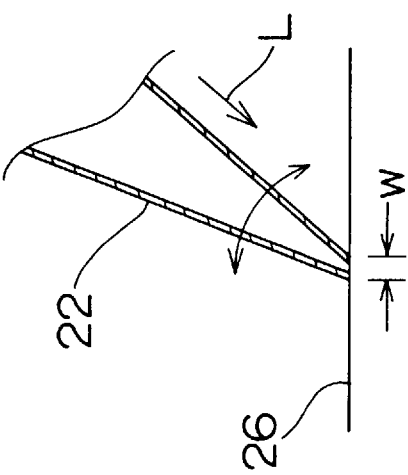

FIG. 10A and FIG. 10B are sectional views in side elevation of the tips of nose-like portions 22. Each tip has a width W. If the width W is narrow as shown in FIG. 10A, the nose-like portion 22 in contact with the bar code surface 26 readily becomes unsteady back-to-forth. This causes the bar code reading angle to vary, thus making it difficult to read a bar code. In this connection, when the width W is made wider as shown in FIG. 10B, the nose-like portion 22 in contact with the bar code surface 26 is fixed back-to-forth to prevent the bar code reading angle G from varying. However, if the width W is too wide, the tip of the nose-like portion 22 is kept away from the position to be irradiated by the LEDs 27. This makes it difficult for a user to accurately take aim with the handy terminal 21 at a bar code. It is therefore required to set the width W to a proper value.

Figure 11:
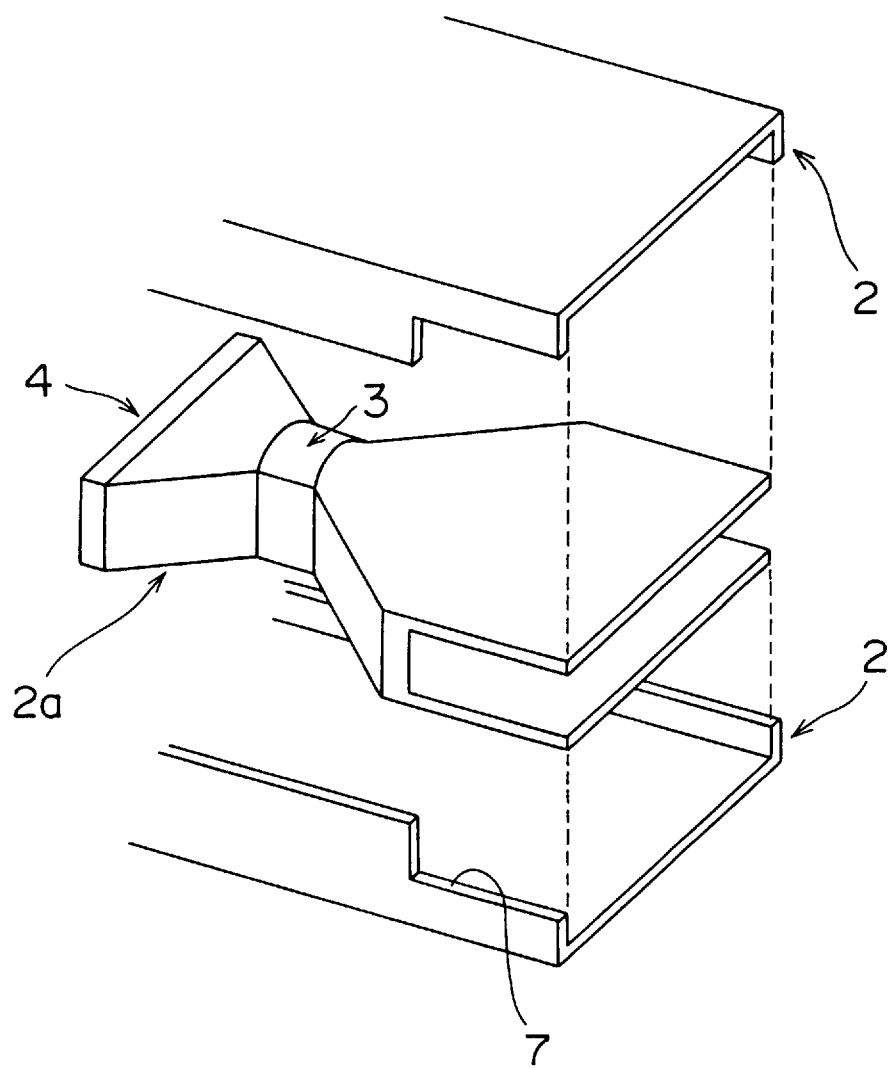
FIG. 11 is an exploded view of an example of a bar code scanning apparatus in which a lens system, illuminating light sources and a one-dimensional image sensor are assembled in a unitary structure in an optical system case body made of resin and which is handled as one module.

It is noted that the present invention is not limited to the embodiment above-mentioned. In the embodiment above-mentioned, each of the lens system 3, the set of illuminating light sources 5 and the image sensor 4 is formed by an individual component element. However, these elements may be integrated with an optical case body 2a made of resin and the case body 2a may be fixed as vertically by and between the case body 2 of the bar code scanning apparatus as shown in FIG. 11. The component elements thus assembled in a unitary structure may be handled as one module. This improves productivity and facilitates manipulation.

In the embodiment above-mentioned, the illuminating light sources are disposed in the plane including both the bar code scanning axis and the optical axis X. The LEDs at the left of the optical axis X are to illuminate the right side of a bar code, while the LEDs at the right of the optical axis X are to illuminate the left side of the bar code. However, the LED arrangement is not limited to such an arrangement. For example, as shown in FIGS. 12 and 13, the light sources for illuminating a read surface may comprise light sources 12 for illuminating the open zone of the opening and left- and right-hand light sources 13 which are to illuminate zones outside of both lateral ends of the opening and which are disposed in the plane including both the bar code scanning axis and the optical axis of the lens system.

The light sources 12 are disposed immediately inside of the opening 1 and in a plane which vertically deviates from the plane including both the optical axis X and the bar code scanning axis. The light sources 12 cannot be disposed on the plane including both the scanning axis and the optical axis X, because such a disposition would prevent a light image from being formed on the image sensor.

Figure 12:
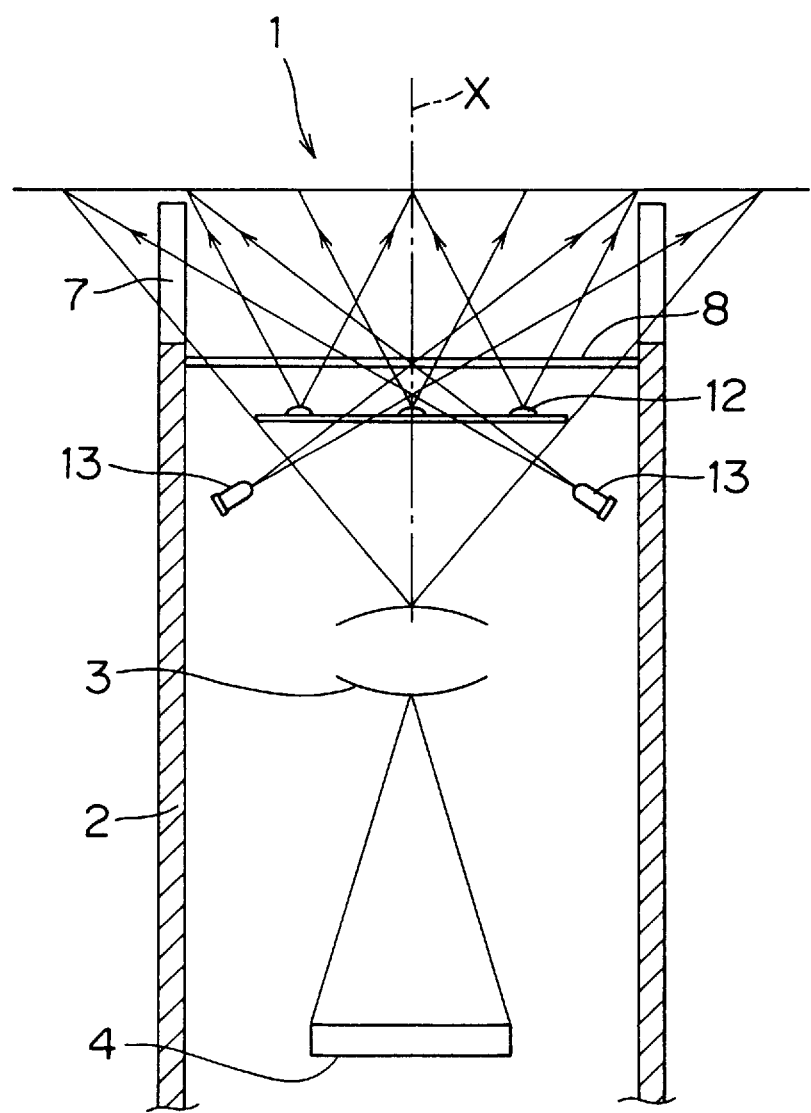
FIG. 12 is a sectional view of a bar code scanning apparatus including (i) optical sources for irradiating the open zone of the opening and (ii) left- and right optical sources which irradiate zones outside of the lateral ends of the opening and which are disposed in the plane including both the bar code scanning axis and the optical axis of a lens system.

The light sources 13 are arranged to illuminate zones outside of the both lateral ends of the opening, i.e., both ends of a bar code, and disposed outside of the visual field of the lens system to prevent interference with image formation on the image sensor (See FIG. 12). The light sources 13 are disposed in the plane including both the bar code scanning axis and the optical axis X. Thus, the rays of light are not intercepted by wall portions defining the slits 7 and therefore efficiently illuminate both ends of a bar code.

As compared with the arrangement in FIGS. 1 and 2, the arrangement in FIGS. 12 and 13 is further improved in space usage.

Further, the present invention can be used not only for a bar code scanning apparatus using a one-dimensional image sensor, but also for a bar code scanning apparatus using a two-dimensional image sensor. In such an application, too, a bar code wider than the width of the opening 1 of the case body 2 can be scanned.

It is a matter of course that the present invention is not limited to the embodiments above-mentioned, but a variety of modifications and changes thereof can be made within the range of the present invention.

What is claimed is:

1. A bar code scanning apparatus for forming an image of a bar code disposed on a read surface, comprising:

a case body having an opening;

an image sensor housed in the case body;

a lens system housed in the case body, the lens system having a focusing point at the opening;

wherein a visual field of the lens system at the focusing point extends outwardly exceeding a width of the opening of the case body, and wherein the case body has lateral sides having slits which communicate with the opening so as not to interrupt optical paths in the visual field of the lens system, thereby enabling the image to be formed on the image sensor when the apparatus is positioning so that the opening is in contact at the read surface.

2. A bar code scanning apparatus according to claim 1, wherein the case body is fan shaped at the opening so as to spread the opening.

3. A bar code scanning apparatus according to claim 1, further comprising light sources for illuminating the read surface, disposed in a plane including a bar code scanning axis and an optical axis of the lens system.

4. A bar code scanning apparatus according to claim 3, wherein the light sources are disposed at opposite left and right lateral sides of the optical axis of the lens system such that the light sources disposed at the left side of the optical axis illuminate the right side of the bar code, and the light sources disposed at the right side of the optical axis illuminate the left side of the bar code.

5. A bar code scanning apparatus according to claim 1, further comprising light sources for illuminating the read surface, including first light sources for illuminating an open zone of the opening, and second light sources for illuminating zones outside of lateral ends of the opening, the first light sources being disposed out of a plane including a bar code scanning axis and an optical axis of the lens system, the second light sources being disposed in said plane.

6. A bar code scanning apparatus for forming an image of a bar code disposed on a read surface, comprising:

a case body having an opening and a portion projecting from the opening from one side of the case body;

a light source disposed at a side of the case body opposite to the one side;

an image sensor housed in the case body;

a lens system housed in the case body, the lens system having a focusing point at a tip portion of the projecting portion;

wherein a visual field of the lens system at the focusing point extends outwardly exceeding a width of the opening of the case body, so that with the tip portion in contact with the read surface at a distance from the opening, an image of the bar code is formed at the image sensor.

7. A bar code scanning apparatus according to claim 6, wherein the tip portion is formed with a planar surface that defines a bar code reading angle.

8. A bar code scanning apparatus according to claim 6, further comprising light sources for illuminating the read surface, disposed in a plane including a bar code scanning axis and an optical axis of the lens system.

9. A bar code scanning apparatus according to claim 8, wherein the light sources are disposed at opposite left and right lateral sides of the optical axis of the lens system such that the light sources disposed at the left side of the optical axis illuminate the right side of the bar code, and the light sources disposed at the right side of the optical axis illuminate the left side of the bar code.

10. A bar code scanning apparatus according to claim 6, further comprising light sources for illuminating the read surface, including first light sources for illuminating an open zone of the opening, and second light sources for illuminating zones outside of lateral ends of the opening, the second light sources being disposed in a plane including a bar code scanning axis and an optical axis of the lens system.

11. A bar code scanning apparatus for forming an image of a bar code disposed on a read surface, comprising:

a case body having an opening and being fan-shaped at the opening so as to spread the opening;

an image sensor housed in the case body;

a lens system housed in the case body, the lens system having a focusing point at a center portion of the opening;

wherein a visual field of the lens system at the focusing point extends outwardly exceeding a width of the opening, and wherein the case body does not interrupt optical paths in the visual field of the lens system, thereby enabling the image to be formed on the image sensor when the apparatus is positioned so that the center portion of the opening is at the read surface.

12. A bar code scanning apparatus according to claim 11, further comprising light sources for illuminating the read surface, disposed in a plane including a bar code scanning axis and an optical axis of the lens system.

13. A bar code scanning apparatus according to claim 12, wherein the light sources are disposed at opposite left and right lateral sides of the optical axis of the lens system such that the light sources disposed at the left side of the optical axis illuminate the right side of the bar code, and the light sources disposed at the right side of the optical axis illuminate the left side of the bar code.

14. A bar code scanning apparatus according to claim 11, further comprising light sources for illuminating the read surface, including first light sources for illuminating an open zone of the opening, and second light sources for illuminating zones outside of lateral ends of the opening, the second light sources being disposed in a plane including a bar code scanning axis and an optical axis of the lens system.

* * * * *